(12) United States Patent  (10) Patent No.: US 7,544,441 B2
Iwasa et al.  (45) Date of Patent: Jun. 9, 2009

(54) SECONDARY BATTERY HAVING AN ACTIVE MATERIAL RADICAL COMPOUND

(75) Inventors: Shigeyuki Iwasa, Tokyo (JP); Kentaro Nakahara, Tokyo (JP); Yukiko Morioka, Tokyo (JP); Jiro Iriyama, Tokyo (JP); Masaharu Satoh, Tokyo (JP)

(73) Assignee: NEC Corporation, Tokyo (JP)

( * ) Notice: Subject to any disclaimer, the term of this patent is extended or adjusted under 35 U.S.C. 154(b) by 678 days.

(21) Appl. No.: 10/492,943

(22) PCT Filed: Oct. 18, 2002

(86) PCT No.: PCT/JP02/10852

§ 371 (c)(1),
(2), (4) Date: Apr. 19, 2004

(87) PCT Pub. No.: WO03/036743

PCT Pub. Date: May 1, 2003

(65) Prior Publication Data

US 2004/0248004 A1  Dec. 9, 2004

(30) Foreign Application Priority Data

Oct. 19, 2001 (JP) .............................. 2001-322187

(51) Int. Cl.
*H01M 4/60* (2006.01)
(52) U.S. Cl. .................................... 429/213
(58) Field of Classification Search .................. 429/213
See application file for complete search history.

(56) References Cited

U.S. PATENT DOCUMENTS 6,866,964 B2 * 3/2005 Nakahara et al. ............ 429/213

FOREIGN PATENT DOCUMENTS

EP  1 049 182 A2  11/2000

JP  2002-117852 A  4/2002

OTHER PUBLICATIONS

Platonova et al., Electrochemical oxidation of nitrogen oxide radicals, Elektrokhimiya (1977), 13(3), 391-393. (only STN printout available).*

* cited by examiner

*Primary Examiner*—Tracy Dove
(74) *Attorney, Agent, or Firm*—Sughrue Mion, PLLC

(57) ABSTRACT

A secondary battery is provided which has a high energy density, a high capacity, an excellent stability in charge-discharge cycle as well as an excellent safety. The secondary battery comprises at least a positive electrode, a negative electrode and an electrolyte, wherein an active material of at least one of the positive and negative electrodes includes at least one compound selected from the group consisting of radical compounds represented by the formula (1) or the formula (3):

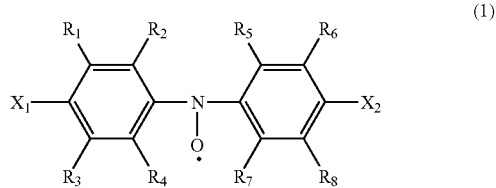

(in the formula (1), X1 and X2 each independently represent a group represented by the formula (3), alkoxyl group, halogen atom, hydroxyl group or cyano group, and R1~R8 each independently represent hydrogen atom or alkyl group.)

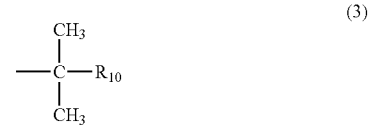

(in the formula (3), R10 represents alkyl group or substituted or unsubstituted phenyl group.)

2 Claims, 1 Drawing Sheet

SECONDARY BATTERY HAVING AN ACTIVE MATERIAL RADICAL COMPOUND

TECHNICAL FIELD

The present invention relates to a secondary battery, and more particularly to a secondary battery with a high energy density and a high capacity as well as a high stability.

BACKGROUND ART

As a rapid spread in the market of small-size or portable electronic devices such as note-type personal computers and portable telephone devices has appeared in recent years, the requirements for reducing the weight and increasing the capacity of the battery to be used therefor have been on the increase. In order to respond to these requirements, a development has been aggressive of the secondary battery which utilizes an electrochemical reaction through delivery and receipt of charges by charge carriers of alkali metal ions such as lithium ions. The lithium ion secondary battery with a large density and high capacity battery as well as an excellent stability has been utilized to a variety of electronic devices. Such the lithium ion secondary battery uses a lithium-containing transition metal oxide such as lithium manganate or lithium cobalt oxide as the positive electrode active material and carbon as the negative electrode active material. The charge and discharge are made by utilizing incorporating and eliminating lithium ions into and from the active material.

This lithium ion secondary battery uses a metal oxide with a large specific gravity for the positive electrode. This battery has an insufficient capacity per a unit mass. Accordingly, high capacity batteries were developed using materials of smaller weights. U.S. Pat. No. 4,833,048 and Japanese patent No. 215778 disclose batteries using organic compounds having a disulfide bond. The battery utilizes an oxidation and reduction reaction as an electrochemical reaction with generation of disulfide bonds and dissociation of the bonds. This battery comprises the electrode materials which consist mainly of elements of small specific gravity such as sulfur and carbon. This is effective to the battery with the high energy density and the large capacity. It is, however, disadvantageous that an efficiency of re-forming the bond from once dissociated bond and a diffusion of the active material into the electrolytic solution, whereby cyclic charge and discharge processes reduce the capacity.

Another battery was proposed which uses a conductive polymer as an organic compound for the electrode material. This battery utilizes doping and dedoping reactions of electrolytic ions to be doped into and dedoped from the conductive polymer. The doping reaction is a reaction of stabilizing an exciton with a paired ion, wherein the exciton is a charged soliton or a polaron which is generated through oxidation and reduction of the conductive polymer. The dedoping reaction opposites to the doping reaction. The dedoping reaction is a reaction of electrochemically oxidizing or reducing an exciton stabilized with the pared ion. U.S. Pat. No. 4,442,187 discloses a battery using such the conductive polymer for the positive or negative electrode. The secondary battery comprises elements with a lower specific gravity such as carbon and nitrogen. The secondary battery thus has been expected to be developed as a large-capacity secondary battery. In the conductive polymer, excitons generated by oxidation or reduction are delocalized over a wide region of π-electron conjugated system and interacted with each other. This limits a concentration of excitons generated, and therefore, limits the capacity of the battery. Thus, the secondary battery using the conductive polymer as the electrode material is effective to reduction in weight of the battery but is insufficient in view of obtaining a large capacity.

As described above, there have been various proposals for the secondary battery which does not use any transition-metal containing active material, in order to achieve the large-capacity secondary battery. There had not yet been realized any stable secondary battery with the high energy density and the large capacity.

As described above, the lithium-ion secondary battery using the transition metal oxide for the positive electrode uses elements of large specific gravity, for which reason it had been difficult, in principle, to prepare such a secondary battery with a larger capacity than the existent battery.

Accordingly, it is an objective of the present invention to provide a novel secondary battery being highly stable in charge-discharge cycle processes and having a higher energy density and a larger capacity.

DISCLOSURE OF THE INVENTION

The present inventors could find that the above issues may be solved by using a compound represented by formula (1), (2), (3), (4) or (5) as an active material of the electrode.

Accordingly, the present invention is a secondary battery comprising at least a positive electrode, a negative electrode and an electrolyte, wherein an active material of at least one of the positive and negative electrodes includes at least one compound selected from the group consisting of radical compounds represented by the formulae (1), (2), (3), (4) and (5):

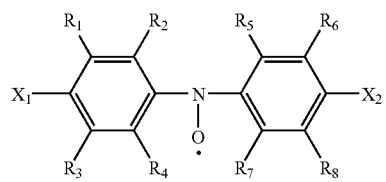

(1)

(in the formula (1), X1 and X2 each independently represent a group represented by the formula (3), alkoxyl group, halogen atom, hydroxyl group or cyano group, and R1~R8 each independently represent hydrogen atom or alkyl group.)

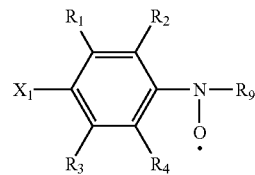

(2)

(In the formula (2), X1 represents a group represented by the formula (3), alkoxyl group, halogen atom, hydroxyl group or cyano group, and R1~R8 each independently represent hydrogen atom or alkyl group, and R9 represents a group represented by the formula (3))

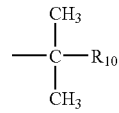

(3)

(in the formula (3), R10 represents alkyl group or substituted or unsubstituted phenyl group.)

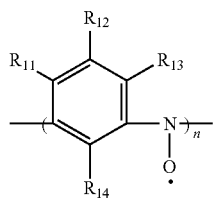

(4)

(in the formula (4), R11~R14 each independently represent hydrogen atom, alkyl group, alkoxyl group, cyano group, or halogen atom, and n represents a natural number.)

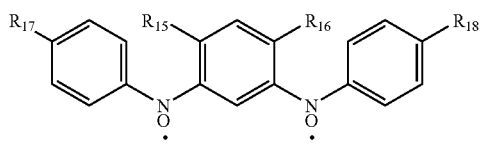

(5)

(in the formula (5), R15~R18 each independently represent hydrogen atom, alkyl group, alkoxyl group, cyano group, nitro group or halogen atom.)

The present invention is also a secondary battery utilizing an electrode reaction of active material, wherein a reactant or a product from an electrode reaction of at least one of the positive and negative electrodes is a radical compound represented by the formulae (1), (2), (3), (4) and (5):

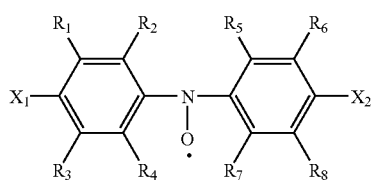

(1)

(in the formula (1), X1 and X2 each independently represent a group represented by the formula (3), alkoxyl group, halogen atom, hydroxyl group or cyano group, and R1~R8 each independently represent hydrogen atom or alkyl group.)

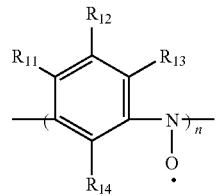

(2)

(In the formula (2), X1 represents a group represented by the formula (3), alkoxyl group, halogen atom, hydroxyl group or cyano group, and R1~R8 each independently represent hydrogen atom or alkyl group, and R9 represents a group represented by the formula (3))

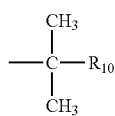

(3)

(in the formula (3), R10 represents alkyl group or substituted or unsubstituted phenyl group.)

(4)

(in the formula (4), R11~R14 each independently represent hydrogen atom, alkyl group, alkoxyl group, cyano group, or halogen atom, and n represents a natural number.)

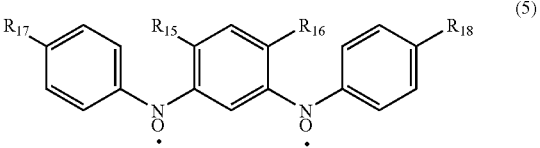

(5)

(in the formula (5), R15~R18 each independently represent hydrogen atom, alkyl group, alkoxyl group, cyano group, nitro group or halogen atom.)

In accordance with the present invention, it is preferable that the active material is an active material of the positive electrode.

It is also preferable that the electrode reaction is an electrode reaction at the positive electrode.

In case that the electrode reaction is an electrode reaction at the positive electrode, it is preferable that the electrode reaction is a discharge reaction generating a bond of the radical compound and an electrolytic cation, and a charge reaction as a reverse reaction to the discharge reaction.

In this case, it is preferable that the electrolytic cation is lithium ion.

In case that the electrode reaction is an electrode reaction at the positive electrode, the electrode reaction may also be a discharge reaction cleaving a bond of the radical compound and an electrolytic anion, and a charge reaction as a reverse reaction to the discharge reaction.

The present invention has been made based on discovering that the above-described compounds are excellent as the electrode active material. Those compounds comprise carbon, nitrogen, hydrogen and oxygen, and which comprise any elements of small masses, for which reason a mass of the active material may be small. The use of those compounds is effective to manufacture a battery having a larger energy density per a unit mass.

In accordance with the resent invention, the electrode reaction of the secondary battery is an oxidation reduction reaction of a compound represented by the formula (1), (2), (3), (4) or (5) (hereinafter, in case, referred to as nitroxyl radial compound). This reaction cases almost no side reaction and is a 100%-reversible and stable reaction. It is unlikely possible that the active material is reduced by diffusion of the active material into an electrolytic solution. This allows obtaining a secondary battery superior in cyclic performances.

In the battery, the electrode active material is oxidized or reduced through the electrode reaction, for which reason the electrode active material takes two states of a start state and an oxidized or reduced state. In accordance with the present invention, the active material in the start state and the oxidized or reduced state takes the structure represented by the formula (1), (2), (3), (4) or (5).

In accordance with a charge-discharge mechanism, a compound having nitroxyl radical as the active material exhibits reversible changes between a radial state and an ionized state through the electrode reaction, thereby accumulating and discharging charges. The above nitroxyl radial compound directly contributes to the electrode reaction at the positive or negative electrode. The electrode using those compound as the active material is not limited to either one of the positive and negative electrodes. Notwithstanding, in view of the energy density, it is preferable to use those compound as the active material of the positive electrode. In accordance with the present invention, the electrode cation is not limited particularly. Notwithstanding, lithium ion is preferable in view of obtaining a high capacity.

THE BEST MODE FOR CARRYING OUT THE INVENTION

Figure 1:
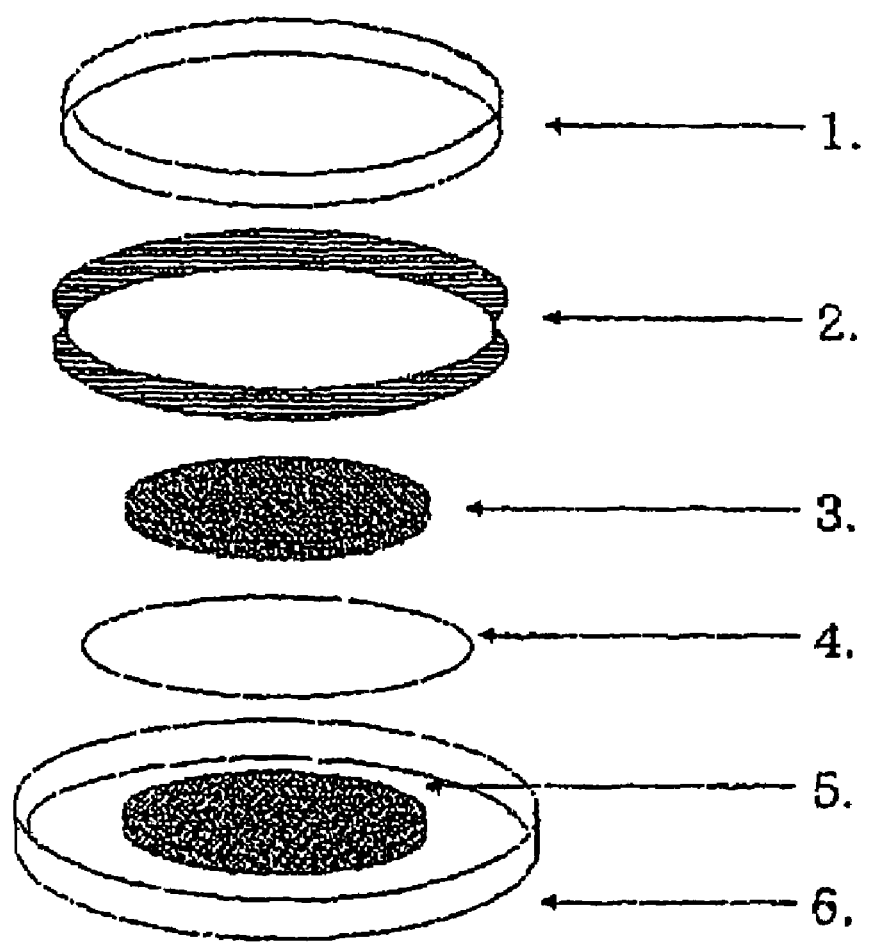
FIG. 1 is a schematic view showing one example of a structure of a battery according to the present invention.

The embodiments of the present invention will hereinafter be described.

Embodiment 1

In accordance with the present invention, a compound represented by the formula (1) may be used as an active material.

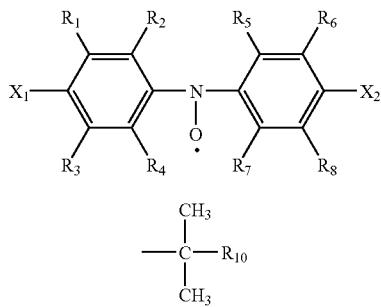
(1)

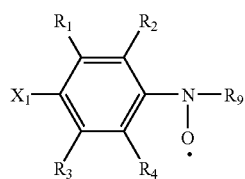
(3)

In the formula (1), X1 and X2 may be identical with or different from each other, and represent a group represented by the formula (3), (in which R10 represents alkyl group or substituted or unsubstituted phenyl group), alkoxyl group, halogen atom, hydroxyl group or cyano group, and R1~R8 each independently represent hydrogen atom or alkyl group. X1 and X2, for example, represent ternary alkyl groups such as tert-butyl group, 1,14-dimethylpropyl group, 1,1-dimethylbutyl group, 1,1-dimethylpentyl group, 1,1-dimethylhexyl group, and 1,1-dimethylheptyl group; phenyl-group-substituted ternary alkyl groups such as 2-(2-phenyl)propyl group, 2-(2-tryl)propyl group, as 2-(2-fluorophenyl)propyl group, 2-(2-chlorophenyl)propyl group, 2-(2-bromophenyl)propyl group, and 2-(2-iodophenyl)propyl group; alkoxyl groups such as methoxyl group, ethoxyl group, propoxyl group, butoxyl group, pentyloxy group, hexyloxy group, heptyloxy group, and octyloxy group; fluorine atom, chlorine atom, bromine atom, iodine atom, hydroxyl group, and cyano group. R1~R8 may be identical with each other or different from each other, and represent hydrogen atom or alkyl groups such as methyl group, ethyl group, propyl group, butyl group, pentyl group, hexyl group, heptyl group, and octyl group. In case that X1 and X2 are the group represented by the formula (3) and R10 is alkyl group or alkoxyl group, it is preferable that the number of carbon atoms in alkyl group or alkoxyl group is 1 through 8. In case that R1 to R8 are alkyl group, it is also preferable that the number of carbon atoms in alkyl group is 1 through 8. This reason is that a larger number of the carbon atoms causes a larger molecular weight, thereby reducing a capacity density of the battery per a unit weight of the active material.

Examples of the compounds represented by the formula (1) may be compounds represented by the formulae (6) through (9).

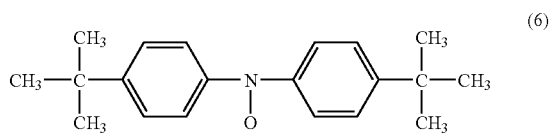
(6)

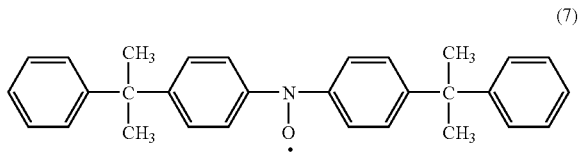
(7)

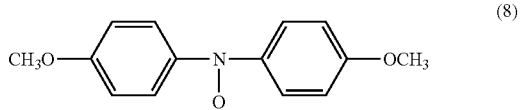
(8)

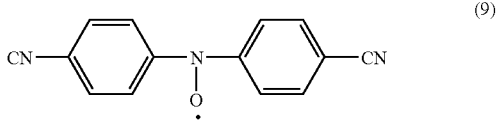
(9)

In accordance with the present invention, the compound represented by the formula (2) may be used as the active material.

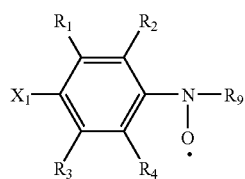
(2)

In the formula (2), X1 represent a group represented by the formula (3), alkoxyl group, halogen atom, hydroxyl group or cyano group. For example, X1 represents ternary alkyl groups such as tert-butyl group, 1,1-dimethylpropyl group, 1,1-dimethylbutyl group, 1,1-dimethylpentyl group, 1,1-dimethylhexyl group, and 1,1-dimethylheptyl group; phenyl-group-substituted ternary alkyl groups such as 2-(2-phenyl)propyl group, 2-(2-tryl)propyl group, as 2-(2-fluorophenyl)propyl group, 2-(2-chlorophenyl)propyl group, 2-(2-bromophenyl)propyl group, and 2-(2-iodophenyl)propyl group; alkoxyl groups such as methoxyl group, ethoxyl group, propoxyl group, butoxyl group, pentyloxy group, hexyloxy group, heptyloxy group, and octyloxy group; fluorine atom, chlorine atom, bromine atom, iodine atom, hydroxyl group, and cyano group. R1~R4 may be identical with each other or different from each other, and represent hydrogen atom or alkyl groups such as methyl group, ethyl group, propyl group, butyl group, pentyl group, hexyl group, heptyl group, and octyl group. R9 represents the group represented by the formula (3), for example, R9 represents ternary alkyl groups such as tert-butyl group, 1,1-dimethylpropyl group, 1,1-dimethylbutyl group, 1,1-dimethylpentyl group, 1,1-dimethylhexyl group, and 1,1-dimethylheptyl group; phenyl-group-substituted ternary alkyl groups such as 2-(2-phenyl)propyl group, 2-(2-tryl) propyl group, as 2-(2-fluorophenyl)propyl group, 2-(2-chlorophenyl)propyl group, 2-(2-bromophenyl)propyl group, and 2-(2-iodophenyl)propyl group; alkoxyl groups such as methoxyl group, ethoxyl group, propoxyl group, butoxyl group, pentyloxy group, hexyloxy group, heptyloxy group, and octyloxy group; fluorine atom, chlorine atom, bromine atom, iodine atom, hydroxyl group, and cyano group.

Examples of the compounds represented by the formula (2) may be compounds represented by the formulae (10) through (14). In case that X1 is the group represented by the formula (3) and R10 is alkyl group or alkoxyl group, it is preferable that the number of carbon atoms in alkyl group or alkoxyl group is 1 through 8. In case that R1 to R4 are alkyl group, it is also preferable that the number of carbon atoms in alkyl group is 1 through 8. This reason is that a larger number of the carbon atoms causes a larger molecular weight, thereby reducing a capacity density of the battery per a unit weight of the active material.

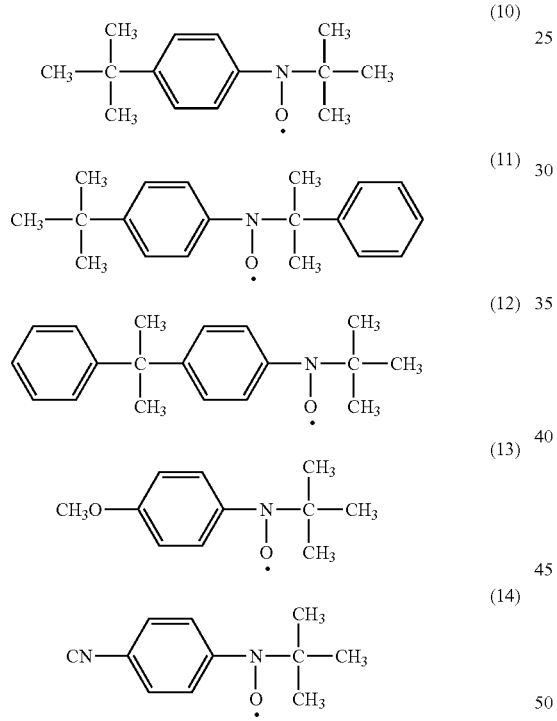

In accordance with the present invention, the compound represented by the formula (4) may be used as the active material.

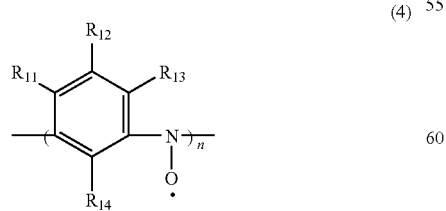

R11 to R14 may be identical with each other or different from each other, and represent hydrogen atom or alkyl groups such as methyl group, ethyl group, propyl group, butyl group, pentyl group, hexyl group, heptyl group, and octyl group; alkoxyl groups such as methoxyl group, ethoxyl group, propoxyl group, butoxyl group, pentyloxy group, hexyloxy group, heptyloxy group, and octyloxy group; fluorine atom, chlorine atom, bromine atom, iodine atom, and cyano group. In case that R11 to R14 are alkyl group or alkoxyl group, it is preferable that the number of carbon atoms in alkyl group or alkoxyl group is 1 through 8. This reason is that a larger number of the carbon atoms causes a larger molecular weight, thereby reducing a capacity density of the battery per a unit weight of the active material. Examples of the compounds represented by the formula (4) may be compounds represented by the formulae (15) through (19).

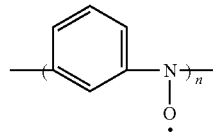

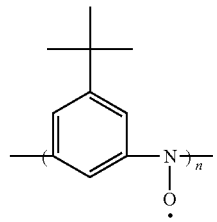

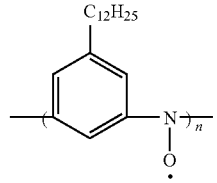

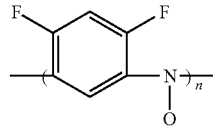

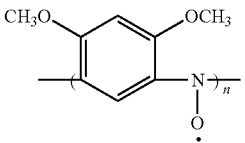

In the above formulae, n represents natural number. The compound represented by the formula (4) is free of any particular limitation to molecular weight.

In accordance with the present invention, the compound represented by the formula (5) may be used as the active material.

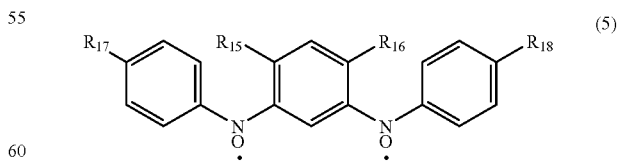

In the formula (5), R15 to R18 each independently represent hydrogen atom or alkyl groups such as methyl group, ethyl group, propyl group, butyl group, pentyl group, hexyl group, heptyl group, and octyl group; alkoxyl groups such as methoxyl group, ethoxyl group, propoxyl group, butoxyl group, pentyloxy group, hexyloxy group, heptyloxy group, and octyloxy group; fluorine atom, chlorine atom, bromine atom, iodine atom, cyano group and nitro group. In case that R15 to R18 are alkyl group or alkoxyl group, it is preferable that the number of carbon atoms in alkyl group or alkoxyl group is 1 through 8. This reason is that a larger number of the carbon atoms causes a larger molecular weight, thereby reducing a capacity density of the battery per a unit weight of the active material. Examples of the compounds represented by the formula (5) may be compounds represented by the formulae (20) through (23).

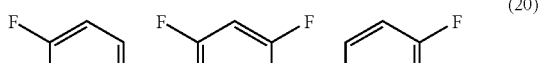

(20)

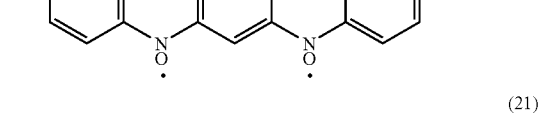

(21)

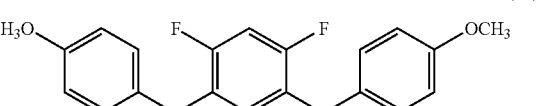

(22)

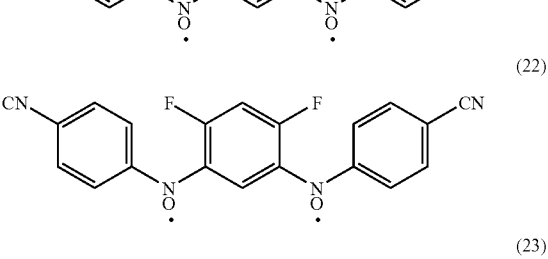

(23)

The above described nitroxyl radical compound may be synthesized by oxidizing a corresponding amine compound with perbenzoic acids such as m-chloroperbenzoic acid and hydrogen peroxide as an oxidizing agent (reaction formula (1)). For example, 4,4'-dimethoxydiphenylnitroxide may be synthesized by oxidizing 4,4'-dimethoxydiphenylamine as the corresponding amine with a perbenzoic acid. This is described in Tetrahydron Letters, P3945, 1964). Other compounds may be obtained by oxidizing corresponding amine in the same manners.

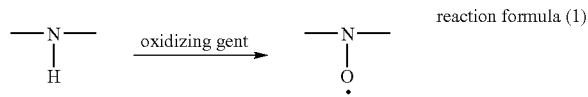

reaction formula (1)

In accordance with the present invention, the active material of the battery may be solid, or dissolved or dispersed in an electrolyte. In case of using the active material in the solid state, an active material insoluble or lowly soluble to the electrolyte is preferable because of small reduction in capacity due to dissolution into the electrolyte. In the battery of the present invention, a single kind of the above-described nitroxyl radical compound as the active material may be used solely, or plural kinds thereof may also be used in combination with each other, or the above-described nitroxyl radical compound may also be used in combination with other active material.

In accordance with the battery of the present invention, the above-described nitroxyl radical compound is used as the active material in the electrode reaction of one or both of the positive and negative electrodes. In case that the above-described nitroxyl radical compound is used as the active material in the electrode reaction of one of the positive and negative electrodes, the known active material may be used in the other electrode.

For example, in case that the above-described nitroxyl radical compound is used in the negative electrode, metal oxide particles, disulfide compound, and conductive polymer may be used in the positive electrode. Examples of the metal oxide may be lithium manganate such as $LiMnO_2$, $Li_xMn_2O_4$ (0<x<2), or lithium manganate with a spinel structure such as $MnO_2$, $LiCoO_2$, and $LiNiO_2$, $Li_xV_2O_5$ (0<x<2), or disulfide compounds such as dithioglycol, 2,5-dimercapt-1,3,4-thiadiazole, and S-triazine-2,4,6-trithiol. Examples of the conductive polymer may be polyacetylene, polyphenylene, polyaniline, and polypyrrole. In accordance with the present invention, those positive electrode materials may be used solely or in combination. It is also possible to use a mixture of the above nitroxyl radical compound and the known active material as a complex active material.

In case that the above nitroxyl radical compound is used in the positive electrode, then a graphite, an amorphous carbon, lithium metals, lithium alloys, lithium ion occluding carbon and conductive polymers. These materials are free of any limitation to the shape. In case of the lithium metal, the material may be in the form of not only film, but also bulk, granulated powder, fiber and flake. Those negative electrode materials may be used solely or in combination. It is also possible to use a mixture of the above nitroxyl radical compound and the known active material as a complex active material.

In case of using the above nitroxyl radical compound for the electrode, an auxiliary conductive material or an auxiliary ion-conductive material may be mixed for reducing an impedance of the electrode. Examples of the auxiliary conductive material may be carbon powders such as graphite, carbon black and acetylene black and conductive polymers such as polyaniline, polypyrrole, polythiophene, polyacetylene and polyacene. Examples of the auxiliary ion-conductive material may be a gel polyelectrolyte and a solid polyelectrolyte.

A binder may be used for reinforcing a bind between respective materials of the electrode. Examples of the binder may be polytetrafluoroethylene, polyvinylidene fluoride, a copolymer of vinylidene fluoride and hexafluoropropylene, a copolymer of vinylidene fluoride and tetrafluoroethylene, a copolymer rubber of styrene and butadiene, and resin binders such as polypropylene, polyethylene, polyimide and polyurethane.

A catalyst may be used for promoting an oxidation reduction reaction in the electrode reaction. Examples of the catalyst may be conductive polymers such as polyaniline, polypyrrole, polythiophene, polyacetylene and polyacene; basic compounds such as pyridine derivatives, pyrolidone derivatives, benzimidazole derivatives, benzothiazole derivatives and acridine derivatives; and metal-ion complexes.

A negative electrode collector and a positive electrode collector may comprise a metal foil or metal plate made of, for example, nickel, aluminum, copper, gold, silver, an aluminum alloy and stainless steel, or a mesh electrode, or a carbon electrode. The collector may be active as a catalyst. The active material may be chemically bonded to the collector. A separator made of a porous film or a nonwoven fabric may be used for preventing any contact between the positive and negative electrodes.

In accordance with the present invention, the electrolyte allows transfers of charge-carriers between the negative and positive electrodes. The electrolyte generally has an ion conductivity of $10^{-5}$ to $10^{-1}$ S/cm at room temperature. The known materials such as $LiPF_6$, $LiClO_4$, $LiBF_4$, $LiCF_3SO_3$, $Li(CF_3SO_2)_2N$, $Li(C_2F_5SO_2)_2N$, $Li(CF_3SO_2)_3C$, and $Li(C_2F_5SO_2)_3C$.

A solvent may be used in an electrolyte solution. In this case, examples of the solvent may be organic solvents such as ethylene carbonate, propylene carbonate, dimethyl carbonate, diethyl carbonate, methyl ethyl carbonate, γ-butyrolactone, tetrahydrofuran, dioxorane, sulforane, dimethylformamide, dimethylacetamide and N-methyl-2-pyrrolidone. These solvents may be used alone or in combination of two or more.

In accordance with the present invention, a solid electrolyte may be used. Examples of polymers used in the solid electrolyte may be vinylidene fluoride polymers such as polyvinylidene fluoride, a copolymer of vinylidene fluoride and hexafluoropropylene, a copolymer of vinylidene fluoride and ethylene, a copolymer of vinylidene fluoride and monofluoroethylene, a copolymer of vinylidene fluoride and trifluoroethylene, a copolymer of vinylidene fluoride and tetrafluoroethylene and a terpolymer of vinylidene fluoride, hexafluoropropylene and tetrafluoroethylene; acrylonitrile polymers such a copolymer of acrylonitrile and methyl methacrylate, a copolymer of acrylonitrile and methyl acrylate, a copolymer of acrylonitrile and ethyl methacrylate, a copolymer of acrylonitrile and ethyl acrylate, a copolymer of acrylonitrile and methacrylic acid, a copolymer of acrylonitrile and acrylic acid and a copolymer of acrylonitrile and vinyl acetate; polyethylene oxide; a copolymer of ethylene oxide and propylene oxide; and polymers of these acrylate or methacrylate. The polymer may contain an electrolyte solution to form a gel or the polymer may be used alone.

In accordance with the present invention, the secondary battery is free of any particular limitation to the form. The conventional ones may be used. For example, the form of battery may be that a lamination of electrodes or a roll of the lamination is sealed in a metal or resin case or with a laminate film comprising a metal foil such as aluminum foil and a synthetic resin film. The shape of battery may be cylindrical, prismatic, coin or sheet, but not limited thereto.

The present invention has no particular limitation to the method of forming the battery. A variety of methods may be used in accordance with materials. For example, a slurry of an active material in a solvent is applied on an electrode collector for subsequently volatilizing the solvent by heating or at ordinary temperature. A separator is then sandwiched between paired electrodes to form a lamination thereof or further rolled to form a roll. The lamination or the roll is then enclosed with a case, and an electrolytic solution is injected therein and then sealed. The solvent for slurry may be ether solvents such as tetrahydrofuran and diethyl ether; amine solvents such as N-methylpyrrolidone; aromatic hydrocarbon solvents such as benzene, toluene, and xylene; aliphatic hydrocarbon solvents such as hexane and heptane; and halogen hydrocarbon solvents such as dichloromethane.

The battery may be prepared by directly using the above-described nitroxyl radical compound as the active material or using a compound which is converted into the above-described nitroxyl radical compound through the electrode reaction. Examples of the compound to be converted into the above-described nitroxyl radical compound through the electrode reaction lithium salts comprising an anion and an electrolyte cation such as lithium ion or sodium ion; sodium salt; and salts comprising an cation and an electrolyte anion such as $PF^{6-}$ or $BF^{4-}$.

In accordance with the present invention, other manufacturing processes for placing leads from the electrodes and packaging the battery may be the known processes.

Details of the present invention will hereinafter be described as examples, but the present invention should not be limited thereto.

EXAMPLE 1

50 mg of a compound (A) having a structure represented by the below formula (A), 200 mg of graphite powders, and 25 mg of polytetrafluoroethylene resin binder were determined and admixed by using an agate mortar. A mixture was obtained by drying and admixture for about 10 minutes. The mixture was then extruded by a roller under a pressure to form a thin film with a thickness of about 200 micrometers. This thin film was dried at 80° C. in a vacuum through one night, before punching the same to form a circle with a diameter of 12 millimeters, thereby forming a coin-shaped electrode for battery.

The obtained electrode was dipped into an electrolytic solution so that the electrolytic solution was impregnated into gaps in the electrode. As the electrolytic solution, there was used a mixture solution of ethylene carbonate and diethylcarbonate including 1 mol/l of an electrolyte salt $LiN(C_2F_5SO_2)_2$ (a mixing ratio of ethylene carbonate and diethylcarbonate is 3:7). The electrode impregnated with the electrolytic solution was placed on a positive electrode collector. A pours film separator impregnated with the electrolytic solution was further laminated over the electrode. A lithium negative electrode was further combined to it and then a copper foil was laminated prior to stacking a negative electrode collector coated with an insulating packing, thereby to form a lamination. The lamination was then applied with a pressure by a caulking machine, to form a sealed coin-shaped battery.

The battery, which has the compound (A) prepared described above as the positive electrode active material and the lithium metal as the negative electrode active material, was charged up at a constant current of 0.1 mA so as to have a voltage of 4.0V. Subsequently, a discharge of the battery was made at a constant current of 0.1 mA. As a result, the voltage was made constant in the vicinity of 3.2V for two hours, and then the voltage was dropped rapidly. After the voltage was dropped to 2.5V, then the battery was re-charged. The charge and discharge were repeated ten times in the range of voltage between 4.0V to 2.5V. As a result, it was confirmed that after the repeat of the charge and discharge processes was made, the voltage was made constant in the vicinity of 3.2V in the discharge process.

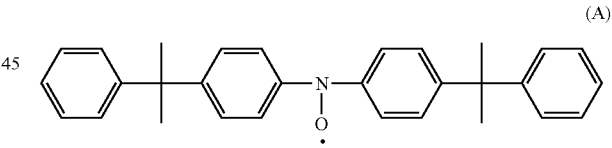

(A)

EXAMPLE 2

An electrode for a coin-shaped battery was prepared in the same manners as in Example 1, provided that 25 mg of a compound (B) having a structure represented by the below formula (B) was used instead of the compound (A). A sealed coin-shaped battery with this electrode was assembled in the same manners as in Example 1, provided that a mixture solution of ethylene carbonate and diethylcarbonate including 1 mol/l of an electrolyte salt $LiN(C_2F_5SO_2)_2$ (a mixing ratio of ethylene carbonate and diethylcarbonate is 3:7) was used together with the separator, the positive electrode collector, the negative electrode (lithium metal) and the negative electrode collector.

The battery, which has the compound (B) prepared described above as the positive electrode active material and the lithium metal as the negative electrode active material, was charged up at a constant current of 0.1 mA so as to have a voltage of 4.0V. Subsequently, a discharge of the battery was made at a constant current of 0.1 mA. As a result, the voltage was made constant in the vicinity of 3.1V for about 100 minutes, and then the voltage was dropped rapidly. After the voltage was dropped to 2.5V, then the battery was re-charged. The charge and discharge were repeated ten times in the range of voltage between 4.0V to 2.5V. As a result, it was confirmed that after the repeat of the charge and discharge processes was made, the voltage was made constant in the vicinity of 3.1V in the discharge process.

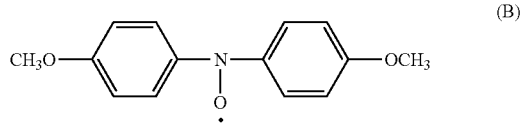

(B)

EXAMPLE 3

An electrode for a coin-shaped battery was prepared in the same manners as in Example 1, provided that 25 mg of a compound (C) having a structure represented by the below formula (C) was used instead of the compound (A). A sealed coin-shaped battery with this electrode was assembled in the same manners as in Example 1, provided that a mixture solution of ethylene carbonate and diethylcarbonate including 1 mol/l of an electrolyte salt $LiN(C_2F_5SO_2)_2$ (a mixing ratio of ethylene carbonate and diethylcarbonate is 3:7) was used together with the separator, the positive electrode collector, the negative electrode (lithium metal) and the negative electrode collector.

The battery, which has the compound (C) prepared described above as the positive electrode active material and the lithium metal as the negative electrode active material, was charged up at a constant current of 0.1 mA so as to have a voltage of 4.0V. Subsequently, a discharge of the battery was made at a constant current of 0.1 mA. As a result, the voltage was made constant in the vicinity of 2.8V for about 90 minutes, and then the voltage was dropped rapidly. After the voltage was dropped to 2.0V, then the battery was re-charged. The charge and discharge were repeated ten times in the range of voltage between 4.0V to 2.0V. As a result, it was confirmed that after the repeat of the charge and discharge processes was made, the voltage was made constant in the vicinity of 2.8V in the discharge process.

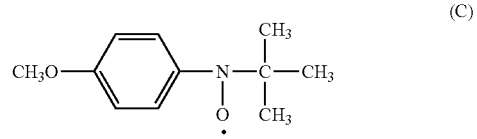

(C)

EXAMPLE 4

An electrode for a coin-shaped battery was prepared in the same manners as in Example 1, provided that 25 mg of a polymer compound (D) having a structure represented by the below formula (D) was used instead of the compound (A). A sealed coin-shaped battery with this electrode was assembled in the same manners as in Example 1, provided that a mixture solution of ethylene carbonate and diethylcarbonate including 1 mol/l of an electrolyte salt $LiN(C_2F_5SO_2)_2$ (a mixing ratio of ethylene carbonate and diethylcarbonate is 3:7) was used together with the separator, the positive electrode collector, the negative electrode (lithium metal) and the negative electrode collector.

The battery, which has the polymer compound (D) prepared described above as the positive electrode active material and the lithium metal as the negative electrode active material, was charged up at a constant current of 0.1 mA so as to have a voltage of 4.0V. Subsequently, a discharge of the battery was made at a constant current of 0.1 mA. As a result, the voltage was made constant in the vicinity of 3.0V for about 4.5 hours, and then the voltage was dropped rapidly. After the voltage was dropped to 2.0V, then the battery was re-charged. The charge and discharge were repeated as a cycle test in the range of voltage between 4.0V to 2.0V at an evaluation temperature of 20° C. As a result of the test, the first time discharge capacity (per a unit weight of the positive electrode) was 144 mAh/g. The fiftieth time discharge capacity was 141 mAh/g. A ratio of the fiftieth time discharge capacity to the first time discharge capacity was 98%.

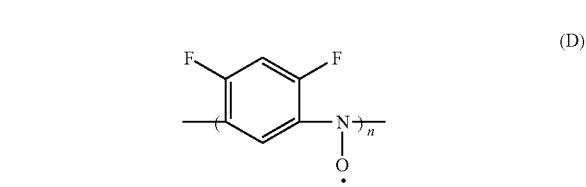

(D)

EXAMPLE 5

An electrode for a coin-shaped battery was prepared in the same manners as in Example 1, provided that 50 mg of a polymer compound (E) having a structure represented by the below formula (E) was used instead of the compound (A). A sealed coin-shaped battery with this electrode was assembled in the same manners as in Example 1, provided that a mixture solution of ethylene carbonate and diethylcarbonate including 1 mol/l of an electrolyte salt $LiN(C_2F_5SO_2)_2$ (a mixing ratio of ethylene carbonate and diethylcarbonate is 3:7) was used together with the separator, the positive electrode collector, the negative electrode (lithium metal) and the negative electrode collector.

The battery, which has the polymer compound (E) prepared described above as the positive electrode active material and the lithium metal as the negative electrode active material, was charged up at a constant current of 0.1 mA so as to have a voltage of 4.0V. Subsequently, a discharge of the battery was made at a constant current of 0.1 mA. As a result, the voltage was made constant in the vicinity of 3.0V for about 3.8 hours, and then the voltage was dropped rapidly. After the voltage was dropped to 2.0V, then the battery was re-charged. The charge and discharge were repeated as a cycle test in the range of voltage between 4.0V to 2.0V at an evaluation temperature of 20° C. As a result of the test, the first time discharge capacity (per a unit weight of the positive electrode) was 106 mAh/g. The fiftieth time discharge capacity was 105 mAh/g. A ratio of the fiftieth time discharge capacity to the first time discharge capacity was 99.1%.

(E)

EXAMPLE 6

An electrode for a coin-shaped battery was prepared in the same manners as in Example 1, provided that 25 mg of a polymer compound (F) having a structure represented by the below formula (F) was used instead of the compound (A). A sealed coin-shaped battery with this electrode was assembled in the same manners as in Example 1, provided that a mixture solution of ethylene carbonate and diethylcarbonate including 1 mol/l of an electrolyte salt LiN($C_2F_5SO_2$)$_2$ (a mixing ratio of ethylene carbonate and diethylcarbonate is 3:7) was used together with the separator, the positive electrode collector, the negative electrode (lithium metal) and the negative electrode collector.

The battery, which has the polymer compound (F) prepared described above as the positive electrode active material and the lithium metal as the negative electrode active material, was charged up at a constant current of 0.1 mA so as to have a voltage of 4.0V. Subsequently, a discharge of the battery was made at a constant current of 0.1 mA. As a result, the voltage was made constant in the vicinity of 2.9V for about 1.5 hours, and then the voltage was dropped rapidly. After the voltage was dropped to 2.0V, then the battery was re-charged. The charge and discharge were repeated as a cycle test in the range of voltage between 4.0V to 2.0V at an evaluation temperature of 20° C. As a result of the test, the first time discharge capacity (per a unit weight of the positive electrode) was 104 mAh/g. The fiftieth time discharge capacity was 103 mAh/g. A ratio of the fiftieth time discharge capacity to the first time discharge capacity was 99%.

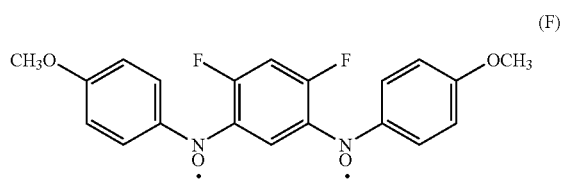

(F)

COMPARATIVE EXAMPLE 225 mg of graphite powders, and 25 mg of polytetrafluoroethylene resin binder were determined and admixed by using an agate mortar. A mixture was obtained by drying and admixture for about 10 minutes. The mixture was then extruded by a roller under a pressure to form a thin film with a thickness of about 215 micrometers. This thin film was dried at 80° C. in a vacuum through one night, before punching the same to form a circle with a diameter of 12 millimeters, thereby forming a coin-shaped electrode for battery.

The obtained electrode was dipped into an electrolytic solution so that the electrolytic solution was impregnated into gaps in the electrode. As the electrolytic solution, there was used a mixture solution of ethylene carbonate and diethylcarbonate including 1 mol/l of an electrolyte salt LiN($C_2F_5SO_2$)$_2$ (a mixing ratio of ethylene carbonate and diethylcarbonate is 3:7). The electrode impregnated with the electrolytic solution was placed on a positive electrode collector. A pours film separator impregnated with the electrolytic solution was further laminated over the electrode. A lithium negative electrode was further combined to it and then a copper foil was laminated prior to stacking a negative electrode collector coated with an insulating packing, thereby to form a lamination. The lamination was then applied with a pressure by a caulking machine, to form a sealed coin-shaped battery.

The battery as prepared was charged up at a constant current of 0.1 mA so as to have a voltage of 4.0V. Subsequently, a discharge of the battery was made at a constant current of 0.1 mA. As a result, the voltage was rapidly dropped to 0.8V for 30 minutes. Subsequently, the battery was re-charged at a constant current of 0.1 mA, thereby causing a rapid voltage increase. After the voltage was increased to 4.0V, then the discharge was made, whereby the voltage was rapidly dropped to 0.8V. The flat region of the voltage in the charge and discharge processes as in the foregoing Examples 1~6 was not confirmed.

INDUSTRIAL APPLICABILITY

As described above, the present invention proposed the novel battery using the nitroxyl radical compound with benzene rings, which is represented by the formula (1), (2), (3), (4) or (5), as the active material for allowing formation of the battery of light weight comprising safety elements free of any heavy metals as the active materials, and also for realizing the battery with a high energy density and a high capacity as well as a high stability.

What is claimed is:

1. A secondary battery utilizing an electrode reaction of active material, wherein a reactant is a radical compound represented by formulae (1), (2), (4) and (5), wherein said electrode reaction is a discharge reaction cleaving a bond of said radical compound and an electrolytic anion, wherein said electrolytic anion is selected from $BF_4^-$, $CF_3SO_3^-$, $(CF_3SO_2)_2N^-$, $(C_2F_5SO_2)_2N^-$, $(CF_3SO_2)_3C^-$, or $(C_2F_5SO_2)_3C^-$, and a charge reaction as a reverse reaction to said discharge reaction:

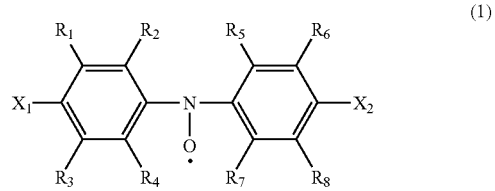

(1)

wherein in the formula (1), $X_1$ and $X_2$ each independently represents a group represented by the formula (3), an alkoxyl group, a halogen atom, a hydroxyl group or a cyano group, and $R_1$ to $R_8$ each independently represents a hydrogen atom or an alkyl group;

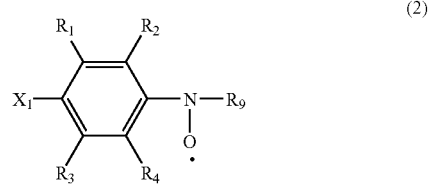

(2)

wherein in the formula (2), $X_1$ represents a group represented by the formula (3), an alkoxyl group, a halogen atom, a hydroxyl group or a cyano group, and $R_1$ to $R_4$ each independently represents a hydrogen atom or an alkyl group, and $R_9$ represents a group represented by the formula (3);

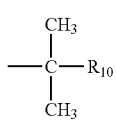
(3)

wherein in the formula (3), $R_{10}$ represents an alkyl group or a substituted or unsubstituted phenyl group;

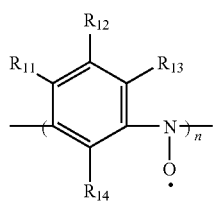
(4)

wherein in the formula (4), $R_{11}$ to $R_{14}$ each independently represents a hydrogen atom, an alkyl group, an alkoxyl group, a cyano group, or a halogen atom, and n represents a natural number;

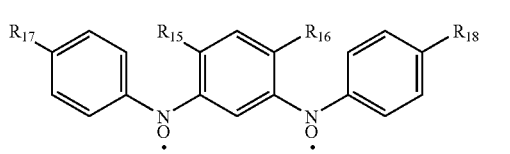
(5)

wherein in the formula (5), $R_{15}$ to $R_{18}$ each independently represents a hydrogen atom, an alkyl group, an alkoxyl group, a cyano group, a nitro group or a halogen atom.

2. A secondary battery utilizing an electrode reaction of active material, wherein a reactant is a radical compound represented by formulae (1), (2), (4) and (5), wherein said electrode reaction is a discharge reaction generating a bond of said radical compound and an electrolytic cation, wherein said electrolytic cation is lithium ion, and a charge reaction as a reverse reaction to said discharge reaction:

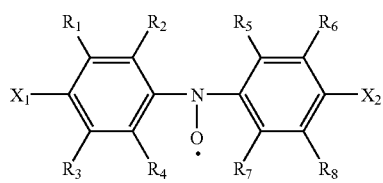
(1)

wherein in the formula (1), $X_1$ and $X_2$ each independently represents a group represented by the formula (3), an alkoxyl group, a halogen atom, a hydroxyl group or a cyano group, and $R_1$ to $R_8$ each independently represents a hydrogen atom or an alkyl group;

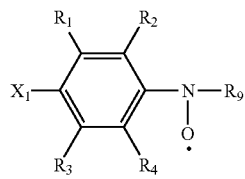
(2)

wherein in the formula (2), $X_1$ represents a group represented by the formula (3), an alkoxyl group, a halogen atom, a hydroxyl group or a cyano group, and $R_1$ to $R_4$ each independently represents a hydrogen atom or an alkyl group, and $R_9$ represents a group represented by the formula (3);

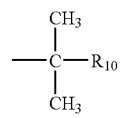
(3)

wherein in the formula (3), $R_{10}$ represents an alkyl group or a substituted or unsubstituted phenyl group;

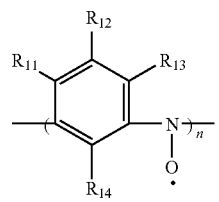
(4)

wherein in the formula (4), $R_{11}$ to $R_{14}$ each independently represents a hydrogen atom, an alkyl group, an alkoxyl group, a cyano group, or a halogen atom, and n represents a natural number;

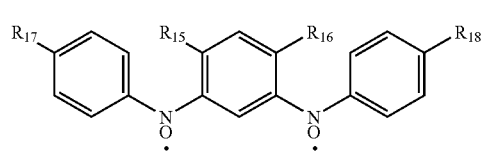
(5)

wherein in the formula (5), $R_{15}$ to $R_{18}$ each independently represents a hydrogen atom, an alkyl group, an alkoxyl group, a cyano group, a nitro group or a halogen atom.

* * * * *